US010201964B2

(12) United States Patent
Grover et al.

(10) Patent No.: US 10,201,964 B2
(45) Date of Patent: Feb. 12, 2019

(54) TREATMENT FOR REDUCING THE TOXICITY OF 3D-PRINTED PARTS

(71) Applicant: The Regents of the University of California, Oakland, CA (US)

(72) Inventors: William H. Grover, Riverside, CA (US); Shirin Mesbah Oskui, Los Angeles, CA (US)

(73) Assignee: The Regents of the University of California, Oakland, CA (US)

(*) Notice: Subject to any disclaimer, the term of this patent is extended or adjusted under 35 U.S.C. 154(b) by 124 days.

(21) Appl. No.: 15/342,015

(22) Filed: Nov. 2, 2016

(65) Prior Publication Data

US 2017/0120523 A1 May 4, 2017

Related U.S. Application Data

(60) Provisional application No. 62/249,911, filed on Nov. 2, 2015.

(51) Int. Cl.
| | |
|---|---|
| *B33Y 70/00* | (2015.01) |
| *C08F 236/12* | (2006.01) |
| *B33Y 10/00* | (2015.01) |
| *B33Y 40/00* | (2015.01) |
| *C08F 220/44* | (2006.01) |
| *B29C 64/106* | (2017.01) |
| *B29C 64/20* | (2017.01) |
| *B29C 64/35* | (2017.01) |
| *B29K 105/00* | (2006.01) |
| *B29K 55/02* | (2006.01) |

(52) U.S. Cl.
CPC ............ *B33Y 70/00* (2014.12); *B29C 64/106* (2017.08); *B29C 64/20* (2017.08); *B29C 64/35* (2017.08); *B33Y 10/00* (2014.12); *B33Y 40/00* (2014.12); *C08F 220/44* (2013.01); *C08F 236/12* (2013.01); *B29K 2055/02* (2013.01); *B29K 2105/0058* (2013.01)

(58) Field of Classification Search
CPC ......... B33Y 70/00; B33Y 10/00; B33Y 40/00; C08F 236/12; C08F 220/44; B01J 19/123; B01J 2219/1203; B01J 2219/0879; B29C 64/20; B29C 64/35; B29C 64/106
USPC ........................................................ 264/494
See application file for complete search history.

(56) References Cited

U.S. PATENT DOCUMENTS

| | | |
|---|---|---|
| 4,575,330 A | 3/1986 | Hull |
| 5,340,433 A | 8/1994 | Crump |
| 2014/0093932 A1 | 4/2014 | Murphy et al. |
| 2017/0259504 A1* | 9/2017 | Lin ........................ B23K 26/12 |

OTHER PUBLICATIONS

Wong et al. "3D Printing of Surgical Instruments for Long-Duration Space Missions", Aviation, Space, and Environmental Medicine, 2014, 85, 758-783.*
Yoshii "Cytotoxic effects of acrylates and methacrylates: relationships of monomer structures and cytotoxicity", Journal of Biomedical Materials Research, 1997, 37, 517-524.*
Wong et al. "3D Printing of Surgical Instruments for Long-Duration Space Missions", Aviation, Space, and Environmental Medicine, 2014, 85, 758-783. (Year: 2014).*
Yoshii "Cytotoxic effects of acrylates and methacrylates: relationships of monomer structures and cytotoxicity", Journal of Biomedical Materials Research, 1997, 37, 517-524. (Year: 1997).*
Canalys Inc., 3D printing market to grow to 16.2 billion USD in 2018. 2014.
Boyd, R. L.; Miller, R.; Vlaskalic, V. The Invisalign system in adult orthodontics: mild crowding and space closure cases, Journal of Clinical Orthodontics 2000, 34, 203-212.
van Noort, R. The future of dental services is digital. Dental Materials 2012, 28, 3-12.
Popov, V.; Evseev, A.; Ivanov, A.; Roginski, V.; Volozhin; A.; Homile, S. Laser stereolithography and supercritical fluid processing for custom-designed implant fabrication. Journal of Materials Science: Materials in Medicine 2004, 15, 123-128.
Matsuda, T.; Mizutani, M. Liquid acrylate-endcapped biodegradable poly (c-caprolactone-co-trimethylene carbonate), II. Computer-aided stereolithographic microarchitectural surface photoconstructs. Journal of Biomedical Materials Research 2002, 62, 395-403.
Wong, J. Y.; Pfahnl, A. C. 3D Printing of Surgical Instruments for Long-Duration Space Missions. Aviation, Space, and Environmental Medicine 2014, 85, 758-763.
Inoue, Y.; Ikuta, K. Detoxification of the Photocurable Polymer by Heat Treatment for Microstereolithography. Procedia CIRP 2013, 115-118.
Cassens, B. J. Inspections, Compliance, Enforcement, and Criminal Investigations, Align Technology Inc. , World Wide Web at fda. gov/ICECI/EnforcementActions/WarningLetters/ucm234578.htm 2010.
D'Urso, P. S.; Effeney, D. J.; Earwaker, W. J.; Barker, T. M.; Redmond; M. J.; Thompson, R. G.; Tomlinson, F. H. Custom cranioplasty using stereolithography and acrylic. British Journal of Plastic Surgery 2000, 53, 200-204.
Stephens, B.; Azimi, P.; El Orch, Z.; Ramos, T. Ultrafine particle emissions from desktop 3D printers. Atmospheric Environment 2013, 79, 334-339.
Kari, G.; Rodeck, U.; Dicker A. P. Zebrafish: an emerging model system for human disease and drug discovery. Clinical Pharmacology and Therapeutics 2007, 62, 70-80.
Lieschke, G. J.; Currie, P. D. Animal models of human disease: zebrafish swim into view. Nature Review Genetics 2007, 8, 353-367.

(Continued)

*Primary Examiner* — Michael Bernshteyn
(74) *Attorney, Agent, or Firm* — Brooks Kushman P.C.

(57) ABSTRACT

A method of reducing the toxicity of a 3D-printed part is provided. The method includes exposing the part to ultraviolet light sufficient to reduce the toxicity of the part. The toxicity of the ultraviolet light-treated part can be based on a comparison with the toxicity of a similarly prepared part not exposed to ultraviolet light.

10 Claims, 4 Drawing Sheets

(56) References Cited

OTHER PUBLICATIONS

Carvan, M. J.; Dalton, T. P.; Stuart, G. W.; Nebert, D. W. Transgenic zebrafish as sentinels for aquatic pollution. Annals of the New York Academy of Sciences 2000, 919, 133-147.
Formlabs Inc., Materials Safety Data Sheet for Clear Photoreactive Resin for Form 1+. 2014.
Yoshii, E. Cytotoxic effects of acrylates and methacrylates: relationships of monomer structures and cytotoxicity. Journal of Biomedical Materials Research 1997, 37, 517-524.
Autian, J. Structure-toxicity relationships of acrylic monomers. Environmental Health Perspectives 1975, 11, 141.

* cited by examiner

TREATMENT FOR REDUCING THE TOXICITY OF 3D-PRINTED PARTS

STATEMENT REGARDING FEDERALLY SPONSORED RESEARCH OR DEVELOPMENT

This invention was made with Government support under Grant No. DBI-1353974 from the National Science Foundation. The Government has certain rights in this invention.

CROSS-REFERENCE TO RELATED APPLICATIONS

This application claims the benefit of Provisional Patent Application No. 62/249,911, filed on Nov. 2, 2015, which is incorporated by reference herein

BACKGROUND

Field of the Invention

The invention relates to reducing toxicity of 3D-printed articles.

Related Art

Even though additive manufacturing or "3D printing" was first introduced in 1983,[1] the technology has become widespread only in the last few years. The value of the 3D printing market grew from $288 million in 2012 to $2.5 billion in 2013 and is projected to grow to $16.2 billion by 2018.[2] Much of this growth has occurred in the life sciences, where 3D printing has found applications in dentistry,[3,4] prosthetics and implantable devices,[5,6] surgical instruments,[7] and even tissue and organ replacement.[8] By providing businesses, researchers, physicians, and hobbyists with custom objects and tools quickly and inexpensively, 3D printers are revolutionizing manufacturing, accelerating research, and changing how medicine is practiced.

In spite of the growing popularity of 3D printers, relatively little is known about the toxicity of 3D-printed parts. Previous work has found that 3D-printed parts can be toxic to cancer cells[9] and may cause allergic or inflammatory responses[5,10] and infections[11] in patients. Additionally, some 3D printers release potentially-hazardous particles into the air during operation.[12] However, the whole-organism health effects of exposure to 3D-printed parts remain largely unexplored. As 3D-printed parts find increasing use in the medical and life science fields, the effects of exposure to these parts need to be understood. Additionally, as consumer-grade 3D printers become more widespread, the amount of 3D-printed parts and printer waste being released into the environment will also grow, and the toxicity of these materials in the environment remains largely unexplored.

With little known about the toxicity of 3D-printed parts, there are consequently few techniques for reducing the toxicity of these parts. Researchers have found that heating a 3D-printed part can reduce its toxicity to cancer cells, but heating also adversely affects the appearance of the part.[9] Treating 3D-printed parts with supercritical carbon dioxide can reduce the inflammation caused when the parts are implanted in the body,[5] but this technique requires a specialized instrument that is more expensive than many 3D printers. There is an unmet need for simple and accessible techniques for reducing the toxicity of 3D-printed parts in research, healthcare, and commercial applications.

SUMMARY

In one aspect, a method of reducing the toxicity of a 3D-printed article is provided. The method includes exposing the article to ultraviolet (UV) light sufficient for the toxicity of the article to be reduced as compared to the toxicity of a similarly prepared article not exposed to ultraviolet light.

In another aspect, a method of preparing a 3D-printed article having reduced toxicity is provided. The method includes obtaining a 3D-printed article, and exposing the article to ultraviolet light sufficient for the toxicity of the article to be reduced as compared to the toxicity of a similarly obtained article not exposed to ultraviolet light.

In any of the forgoing embodiments: a) the article can be printed by an extrusion deposition process or a photopolymerization process; b) the article can be printed with a photocurable liquid resin, which in some embodiments can be a resin that includes one or more acrylic monomers; c) the article can be printed with a thermoplastic polymer, which can be acrylonitrile butadiene styrene; d) the ultraviolet light can have a wavelength of about 350 nm to about 400 nm; e) the article can maintain its integrity and/or appearance following the exposure of the article to the ultraviolet light; f) or any combination of a)-e).

In another aspect, a 3D-printed article having reduced toxicity is provided. The article is prepared by any embodiment of the methods described herein. In some embodiments, the article is printed with a photocurable liquid resin comprising one or more acrylic monomers.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1A:
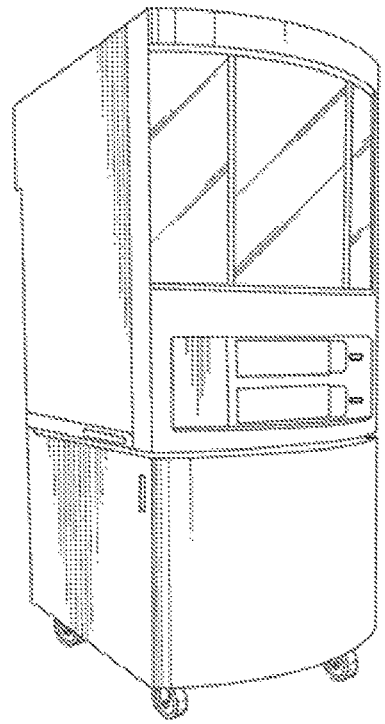
FIG. 1 is a panel of images of commercial 3D printers and test pieces. (1A) A commercial fused deposition modeling (FDM) printer (Dimension Elite by Stratasys, Eden Prairie, Minn.), which deposits melted acrylonitrile butadiene styrene (ABS) layer-by-layer onto a stage to build a 3D-printed part. (1B) A commercial stereolithography (STL) printer (Form 1+by Formlabs, Cambridge, Mass.), which uses a light source to polymerize a liquid resin to form a printed part. (1C) Examples of the FDM- and STL-printed test parts used in this study (40 mm diameter and 4 mm height). Also shown is an STL-printed part that was treated with ultraviolet light (STL w UV) to reduce its toxicity. The UV treatment has little effect on the appearance of the printed part.

In accordance with embodiments of the invention, the toxicity of a 3D-printed article or part can be reduced by exposure to ultraviolet light. In some embodiments, the 3D-printed article can be printed by an extrusion deposition process or a photopolymerization process. Examples of extrusion deposition printing include, but are not limited to, fused deposition modeling, laser melting, electron beam melting, laser sintering, and material jetting. Examples of photopolymerization printing include, but are not limited to, stereolithography, photopolymer jetting, and binder jetting.

In embodiments that include 3D-printed articles made by a photopolymerization process, any photocurable liquid resin capable of use in the 3D printing process can be employed to make the 3D-printed article. Examples of photocurable liquid resins that are used in 3D printers include, but are not limited to, trimethylolpropane triacrylate, Sartomer CN2920 and Sartomer CN981 (Sartomer Americas, Exton, Pa), n-vinylpyrrolidone, isobornyl acrylate, cyclohexane dimethanol di-vinyl ether, olygocarbonatedimethacrylate, and the like. A photocurable liquid resin for use in 3D printing can contain monomers and oligomers.

The toxicity of a 3D-printed article can be determined by toxicity assays such as those described herein. In some embodiments, a photocurable liquid resin contains toxic monomers. For example, in some embodiments, the resin contains acrylic monomers. Acrylic monomers can be, but are not limited to, acrylate monomers or methacrylate monomers. In some embodiments, acrylic monomers can be one or a combination of the following monomers:

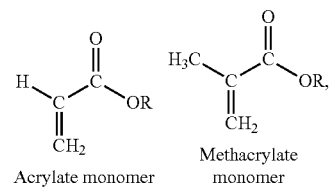

where R is H, methyl, ethyl, n-butyl, isobutyl, or isodecyl.

In embodiments that include 3D-printed articles made by an extrusion deposition process, any thermoplastic polymer capable of use in the 3D printing process can be employed to make the 3D-printed articles. Examples of thermoplastic polymers for use in extrusion deposition printing included, but are not limited to, acrylonitrile butadiene styrene, polylactic acid, nylon, polyurethane, polystyrene, polyvinyl alcohol, polyethylene terephthalate, polycarbonate, acrylonitrile styrene acrylate, polypropylene, polyoxymethylene, polymethylmethacryl, and the like.

Reduced toxicity is a decrease in toxicity of a 3D-printed article when compared to the toxicity of a control article printed in the same way but not treated with ultraviolet light. Toxicity refers to the disruption of normal development or functioning in an organism, tissue or cell caused by exposure to the toxic article. Examples of organisms include, but are not limited to, humans and other primates, mice, rats, and fish. Examples of tissues include, but are not limited to, heart, lung, nervous system, skin, muscle, and epithelial tissue. Examples of cells include, but are not limited to, heart, nerve, skin, blood, pulmonary, hormone-secreting, and reproductive cells.

The dose of ultraviolet light for reducing toxicity that a 3D-printed article is exposed to will vary with the particular features of the article, such as size, shape and composition, and the particular features of the ultraviolet light, such as intensity, wavelength and distance from the article. A person of skill can determine the relevant dose for the particular article. The wavelength of UV light for use in reducing toxicity can be in the range of from 10 nm to 400 nm, or any subrange thereof.

In some embodiments, the article is for use in a context that places the article in direct or close contact with an organism at risk from toxic effects. Examples of such articles include, but are not limited to, personal care articles, articles used with agriculture or pets, articles in contact with food, and the like.

The present invention may be better understood by referring to the accompanying examples, which are intended for illustration purposes only and should not in any sense be construed as limiting the scope of the invention.

EXAMPLE 1

As described herein, the effects of 3D-printed parts on an organism's health was assessed, and a simple technique for reducing the toxicity of these printed parts was developed. Zebrafish (*D. rerio*) was chosen as the model organism for this study. Zebrafish are widely used vertebrate model organisms that, because of their ability to reproduce quickly and in large numbers, make high-throughput screening of potential toxicants feasible and affordable.[13] There are many genetic similarities between humans and zebrafish and the relatively fast development of sophisticated cardiovascular, nervous, and endocrine systems in these animals make them a very popular developmental model.[14] As aquatic organisms, zebrafish are also a relevant model for understanding bioavailability and bioaccumulation of chemical and biological toxicants[15] and overall environmental toxicity. Finally, zebrafish are optically transparent throughout their development (embryonic and adult stage) and can be analyzed using imaging techniques to identify developing pathologies and phenotypic changes in real time.

3D printing is gaining popularity by providing a tool for fast, cost effective, and highly customizable fabrication. However, little is known about the toxicity of 3D-printed objects. The toxicity of printed parts was assessed from two main classes of commercial 3D printers, fused deposition modeling and stereolithography. The toxicity of these 3D-printed parts was assessed using zebrafish (*D. rerio*), a widely used model organism in aquatic toxicology. Zebrafish embryos were exposed to 3D-printed parts and monitored for rates of survival, hatching, and developmental abnormalities. Parts from both types of printers were found to be measurably toxic to zebrafish embryos, with STL-printed parts significantly more toxic than FDM-printed parts. A simple post-printing treatment (exposure to ultraviolet light) was developed that largely mitigates the toxicity of the STL-printed parts, for example. These results call attention to the need for strategies for the safe disposal of 3D-printed parts and printer waste materials.

Methods

3D Printers

The toxicity of printed parts was studied from the two main commercially-available types of 3D printers, fused deposition modeling (FDM) and stereolithography (STL) printers. FDM printers feed a polymer filament into a heated nozzle that melts the polymer and deposits it layer-by-layer onto the growing part.[16] In this study, the Dimension Elite printer (Stratasys, Eden Prairie, Minn.; FIG. 1A) was used which prints parts out of acrylonitrile butadiene styrene (ABS).

Figure 1B:
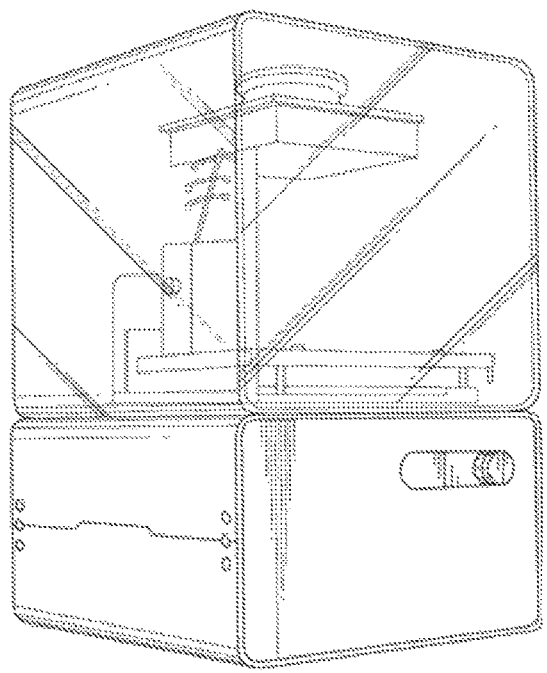

In contrast, STL printers use a light source to polymerize a bath of photocurable liquid resin layer-by-layer to form a finished part.[1] Since the chemical compositions of the photocurable resins are typically not provided by printer manufacturers, little is known about the chemical and biological compatibility of STL-printed parts. In this study, the Form 1+printer (FIG. 1B; Formlabs, Cambridge, Mass.) was used; this printer uses a 405 nm Class 1 laser to cure a resin that is a combination of methacrylated oligomers and monomers and photoinitiators.[17]

3D-Printed Test Parts and Cleaning Procedures

Cylindrical test parts (40 mm diameter and 4 mm thick, shown in FIG. 1C) were designed using SolidWorks (Dassault Systèmes, Vélizy-Villacoublay, France), exported as an .STL file, and printed using the FDM and STL printers. The 3D-printed parts used in toxicity tests in FIGS. 2 and 3 were cleaned according to the printer manufacturers' specifications. FDM-printed parts were submerged in a 2% (weight/volume) sodium hydroxide solution for 4 hours to dissolve the temporary polylactic acid supports, then rinsed with ultrapure water and air-dried. STL-printed parts were washed in two consecutive baths of isopropyl alcohol for five minutes each, then air-dried.

To determine the effects of different part cleaning techniques on the toxicity of the printed parts, additional 3D-printed parts were cleaned using alternative cleaning procedures with little or no effect on the toxicity results of the printed parts.

UV Light Exposure of STL-Printed Parts

Exposure to ultraviolet light was used to detoxify some STL-printed parts in this study. An Intelli-Ray 400 UV light source (Uvitron International, Inc., West Springfield, Mass.) with peak irradiance 100-120 mW/cm$^2$ was used. Each STL-printed part was exposed to UV light at 50% lamp power for 30 minutes exposure time on each side, for a total of 1 hour exposure time per part.

Animal Husbandry and Exposure to 3D-Printed Parts

The toxicity of 3D-printed parts was assessed using zebrafish (*D. rerio*) following a specific protocol approved by the University of California, Riverside's Animal Care and Use Committee (approval number 20130005). The zebrafish were wild-type AB strain and approximately 16 months old at the time of spawning. The fish culture were kept in aerated aged tap water (dechlorinated) at a temperature of 27° C. with a light/dark cycle of 14:10 hours. Males and females were kept separately and fed twice a day on *Artemia* sp. until the night before spawning, when they were transferred to breeding aquaria. Eggs were collected the next morning, examined, and separated based on the stage of the development. All embryos were directly exposed to their respective 3D-printed parts at 2 hours post fertilization. Each printed part was placed in a large sterile petri dish (90 mm in diameter and 15 mm in height) and surrounded with approximately 45 mL of ultrapure water (resistivity 18.2 MΩ·cm at 25° C.).

Each printed part was exposed to 30 embryos and replicated 3 times, for a total of 90 embryos used to study the effectiveness of each cleaning technique for both printing methods. The embryos were monitored for their survival, hatching rate, and developmental abnormalities (reduced length, yolk sac edema, heart edema, spinal flexure, absence of swim bladder, and discoloration) at days 4 and 7 post fertilization by visual inspection. Dead embryos were identified by the loss of translucency and removed from the dish before further inspection of the health of the remaining embryos.

Statistical Analysis and Data Visualization

The significance of the results was tested using the Wilcoxon Rank Sum nonparametric test with appropriate assumptions on R programming language. The p-values were set to 0.05 in order to test for significance of treatments. The results were visualized using the Matplotlib package in the Python programming language.

EXAMPLE 2

Results and Discussion

Assessing the Toxicity of 3D-Printed Parts

FIG. 2A shows the percent survival of embryos exposed to 3D-printed parts from FDM (green) and STL (blue) printers compared to unexposed control embryos (black) through seven days after fertilization. While the embryos exposed to FDM-printed parts had slightly decreased average survival rates compared to control embryos, the embryos exposed to STL-printed parts had significantly-decreased survival rates ($p \leq 0.05$), with more than half of the embryos dead by day 3 and all dead by day 7. The percent of exposed embryos that hatched followed a similar trend (FIG. 2B): embryos exposed to FDM-printed parts had slightly lower hatching rates compared to unexposed embryos, but embryos exposed to STL-printed parts had significantly-decreased ($p \leq 0.05$) hatching rates (essentially zero hatching).

Figure 3:
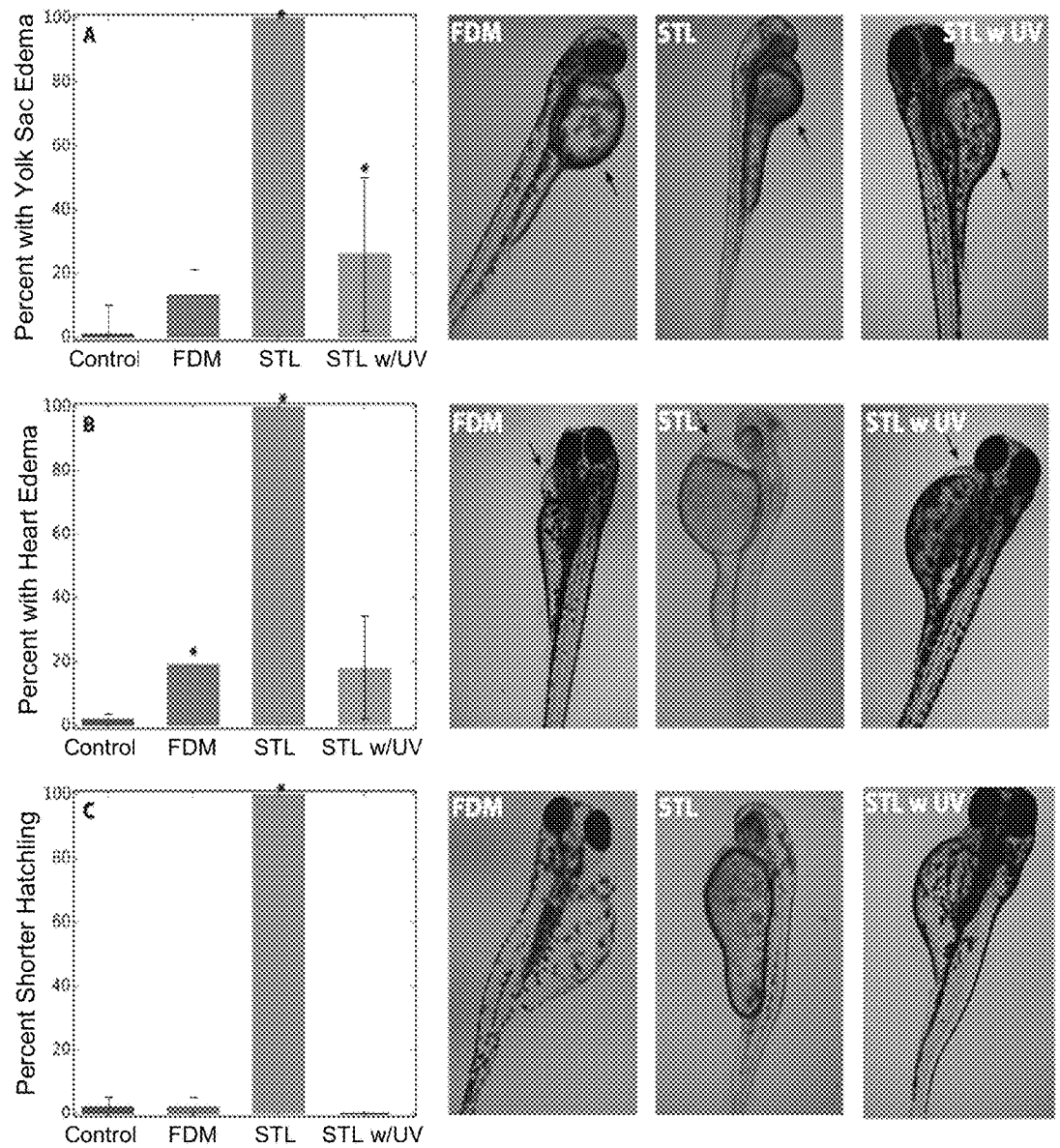
FIG. 3 is a panel showing malformation rates in exposed zebrafish embryos compared to unexposed control embryos. Rates of six types of malformations in zebrafish embryos exposed to FDM-printed parts ("FDM"), embryos exposed to STL-printed parts ("SLT"), embryos exposed to STL-printed parts that received UV treatment ("STL w/UV"), and control embryos that were not exposed to printed parts (Control). The observed malformations were yolk sac edema (3A), heart edema (3B), embryo length deformation (3C), spine flexures (3D), lack of melanophore development (3E), and lack of swim bladders (3F). Malformations 3A through 3E were monitored at day 4 and day 7 post fertilization, and malformation 3F was monitored at day 7. Unexposed control embryos had low levels of malformation in all six categories, and embryos exposed to FDM-printed parts had elevated rates of malformations in three of the six categories (see, 3A, 3B, and 3F). However, 100% of embryos exposed to STL-printed parts had a significantly higher rate of malformations in all six categories. Since the embryos that were exposed to STL-printed parts did not survive past 7 days, these embryos were not checked for the development of swim bladders (* in F). Embryos exposed to STL-printed parts that received UV treatment had rates of malformations that were comparable to embryos exposed to FDM-printed parts for malformations 3A through 3E, though they did have significantly slower swim bladder development (3F).
Figure 3:
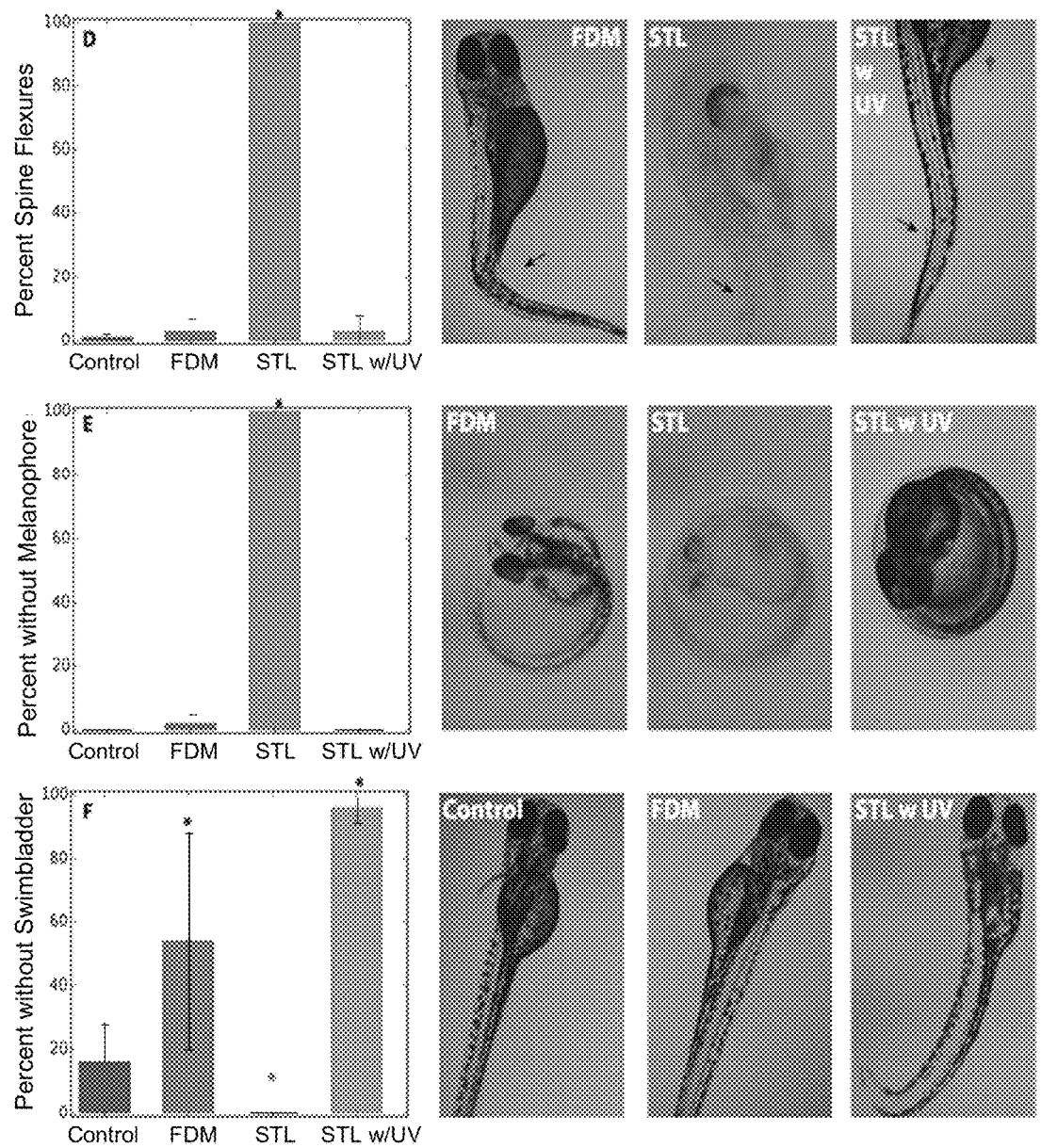

Six deformities were also used as markers to assess the health of embryos after they hatched. Hatchlings were monitored for yolk sac edema (FIG. 3A), heart edema (FIG. 3B), reduced hatchling length (FIG. 3C), presence of spine flexures (FIG. 3D), and lack of melanophores (FIG. 3E)

throughout the seven-day monitoring period, and lack of a swim bladder (FIG. 3F) at day 7 post fertilization. The zebrafish micrographs in FIG. 3 show the most severe cases of deformity in each category, for embryos exposed to parts from each of the 3D printer types. Of the few zebrafish embryos that hatched after exposure to STL-printed parts, 100% of the hatchlings had all six malformations (see FIG. 3). In contrast, zebrafish embryos exposed to FDM-printed parts had significantly lower rates of malformations, although FDM-exposed embryos still had deformities at a rate higher than unexposed control embryos (especially for yolk sac edema) and a statistically significant increase ($p \leq 0.05$) in heart edema (see FIG. 3). Embryos exposed to FDM-printed parts also exhibited significantly delayed swim bladder development ($p \leq 0.05$) compared to the control embryos.

Reducing the Toxicity of STL-Printed Parts

While the exact chemical compositions of the resins used in STL printers are usually trade secrets, the resins' Material Safety Data Sheets indicate that they often contain acrylate and/or methacrylate monomers:

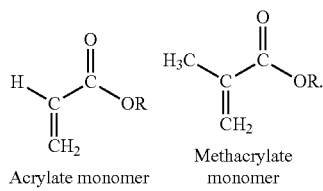

Acrylate monomer     Methacrylate monomer

Specific members of these classes of compounds are already known to be toxic in some situations. For example, acrylate monomers can be acutely toxic if inhaled, swallowed, or come in contact with skin.[18] If the R group is a hydrogen, the resulting compounds (acrylic acid and methacrylic acid) have been shown to have toxic effects on embryonic and fetal development in rat fetuses.[19] If the R group in the methacryate monomer is a methyl group, the resulting compound (methylmethacrylate) and its polymerized form (polymethylmethacrylate or PMMA) have been associated with irreversible cardiovascular failure when used as scaffolds.[19] Finally, exposure to methacrylate monomers with a variety of other R groups (ethyl, n-butyl, isobutyl, and isodecyl) has been observed to cause cytotoxicity, cardiovascular failure, gastrointestinal problems, respiration issues, and developmental malformations.[19] In summary, while the inventors do not know the exact composition of STL printer resins, ample evidence exists for the toxicity of the monomers in these resins.

Based on the known toxicity of acrylate and methacrylate monomers, it was hypothesized that monomers or short-chain polymers may be leaching out of the STL-printed parts and contributing to the extreme toxicity of those parts. To test this hypothesis, gas chromatography-mass spectrometry (GC-MS) analysis of water samples left in contact with STL-printed parts was performed. The results suggest that at least three different chemical species are present in the leachate; these species have different retention times in GC but very similar fragments in MS. This supports the inventors' hypothesis that monomers or short-chain polymers are present in the leachate from STL-printed parts, although additional analysis is necessary for a definitive identification.

Figure 1C:
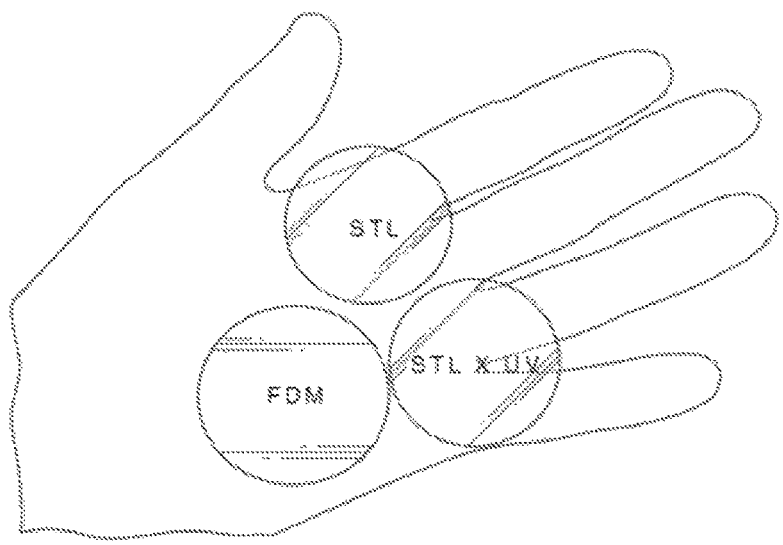
Figure 2:
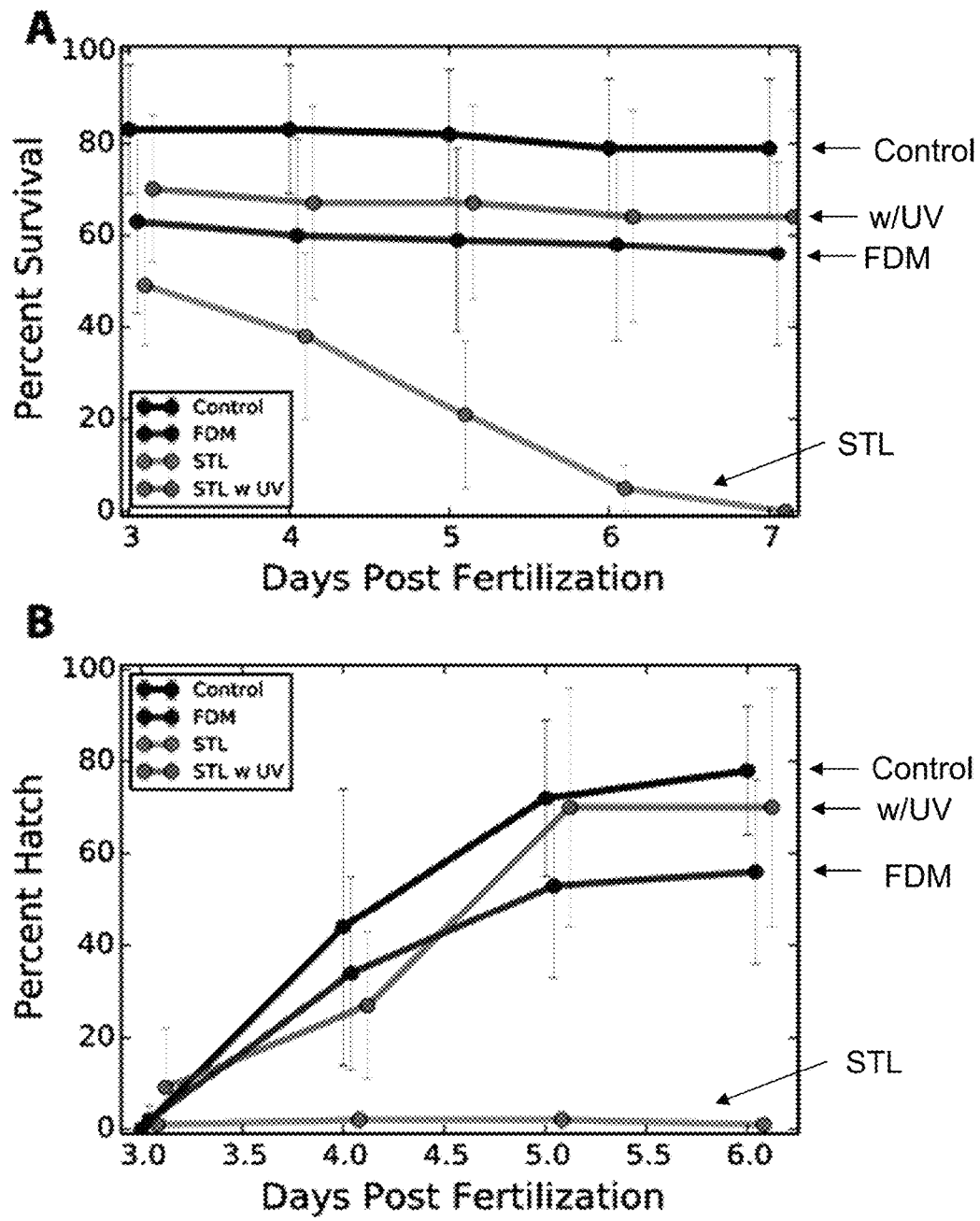
FIG. 2 is a panel of graphs showing survival and hatching rates of exposed zebrafish embryos compared to control unexposed embryos. (2A) Survival rates of zebrafish embryos exposed to 3D-printed parts from a FDM printer ("FDM"), embryos exposed to parts from a STL printer ("STL"), embryos exposed to STL-printed parts that were treated with ultraviolet light ("w/UV"), and control embryos that were not exposed to printed parts ("Control"). Each exposure represents 3 replicates with 30 embryos in each replicate. Embryos exposed to STL-printed parts had significantly lower survival rates by day 3 post fertilization when compared to control embryos ($p \leq 0.05$) with no STL-exposed embryo surviving past day 7. However, embryos exposed to FDM- and UV-treated STL-printed parts did not have significantly decreased survival rates compared to control embryos ($p \geq 0.05$). (2B) Hatching rates for the same four exposure types as in (2A). Embryos exposed to STL-printed parts had significantly lower hatching rates by day 4 post fertilization compared to control embryos ($p=0$); virtually none of the STL-exposed embryos hatched. However, embryos exposed to FDM- and UV-treated STL-printed parts did not have significantly lower hatching rates in the embryos (p≥0.05). These results show that after treating STL-printed parts with UV light, embryos exposed to the treated parts fare almost as well as control embryos that were not exposed to printed parts.

If monomers or short-chain polymers are indeed leaching out of STL-printed parts, additional photoinduced polymerization of the 3D-printed part might reduce the amount of these species leaching out of the printed part and thus reduce the toxicity of the part. To test this hypothesis, STL-printed parts were exposed to ultraviolet light (wavelength 350-400 nm, peak irradiance 100-120 mW/cm$^2$) for 30 minutes on each side of the printed part. As shown in FIG. 1C, this UV exposure treatment has minimal effect on the appearance of the 3D-printed part. Embryos exposed to STL-printed parts that were UV-treated fared much better than embryos exposed to untreated parts. As shown in FIGS. 2A and 2B, the survival and hatching rates of embryos exposed to treated parts recovered to almost control levels. Embryos exposed to UV-treated STL-printed parts also showed a significantly lower incidence of spine flexures (FIG. 3D). All hatchlings exposed to UV-treated parts were normal in length (FIG. 3C) and developed normal levels of melanophores (FIG. 3E). However, embryos exposed to UV-treated parts still had significantly elevated rates of yolk sac edema ($p \leq 0.05$) and heart edema compared to control embryos (FIG. 3A and B) and most of the embryos exposed to UV-treated parts had not developed swim bladders by the end of day 7 (FIG. 3F). So while UV treatment appears to significantly reduce the toxicity of STL-printed parts to zebrafish, it does not completely eliminate the toxicity of these parts and additional research into detoxification strategies is merited.

These findings have important consequences in several different communities: physicians and nurses using 3D-printed parts in clinical applications need to consider the consequences of patient exposure to these parts, researchers using 3D-printed parts in life science experiments should be on the lookout for artifacts caused by exposures of organisms to these objects, and waste collection agencies should develop strategies for the safe collection and disposal of parts and waste materials generated by 3D printers. The cost of 3D printers has dropped dramatically—FDM printers are currently available for as little as $200, and the STL printer used in this study can be bought for $3299—and this trend is expected to continue in the coming years. Consequently, 3D printers are spreading beyond industry and research labs and into homes and small businesses. The individuals using these printers may not have the training necessary to use these printers safely and dispose of their wastes responsibly, and municipal waste disposal agencies may not have resources for collecting and treating 3D printer waste. This situation is particularly worrisome for STL printers, which can generate liters of solvent waste contaminated with resin monomers during post-printing part cleanup. The potential for 3D printer toxic waste to enter waterways is alarming and deserves additional study.

REFERENCES

The following publications are incorporated by reference herein in their entireties:

(1) Hull, C. W. Apparatus for production of three-dimensional objects by stereolithography. 1986; U.S. Pat. No. 4,575,330.
(2) Canalys Inc., 3D printing market to grow to 16.2 billion USD in 2018. 2014.
(3) Boyd, R. L.; Miller, R.; Vlaskalic, V. The Invisalign system in adult orthodontics: mild crowding and space closure cases. *Journal of Clinical Orthodontics* 2000, 34, 203-212.
(4) van Noort, R. The future of dental devices is digital. *Dental Materials* 2012, 28, 3-12.

(5) Popov, V.; Evseev, A.; Ivanov, A.; Roginski, V.; Volozhin, A.; Howdle, S. Laser stereolithography and supercritical fluid processing for custom-designed implant fabrication. *Journal of Materials Science: Materials in Medicine* 2004, 15, 123-128.

(6) Matsuda, T.; Mizutani, M. Liquid acrylate-endcapped biodegradable poly (ε-caprolactone-co-trimethylene carbonate). II. Computer-aided stereolithographic microarchitectural surface photoconstructs. *Journal of Biomedical Materials Research* 2002, 62, 395-403.

(7) Wong, J. Y.; Pfahnl, A. C. 3D Printing of Surgical Instruments for Long-Duration Space Missions. *Aviation, Space, and Environmental Medicine* 2014, 85, 758-763.

(8) Murphy, K.; Dorfman, S.; Law, R. J.; Le, V. A. Devices, systems, and methods for the fabrication of tissue utilizing UV cross-linking. 2013; U.S. patent application Ser. No. 13/794,368.

(9) Inoue, Y.; Ikuta, K. Detoxification of the Photocurable Polymer by Heat Treatment for Microstereolithography. *Procedia CIRP* 2013, 5, 115-118.

(10) Cassens, B. J. Inspections, Compliance, Enforcement, and Criminal Investigations, Align Technology Inc., World Wide Web at fda.gov/ICECl/EnforcementActions/WarningLetters/ucm234578.htm 2010,

(11) D'Urso, P. S.; Effeney, D. J.; Earwaker, W. J.; Barker, T. M.; Redmond, M. J.; Thompson, R. G.; Tomlinson, F. H. Custom cranioplasty using stereolithography and acrylic. *British Journal of Plastic Surgery* 2000, 53, 200-204.

(12) Stephens, B.; Azimi, P.; El Orch, Z.; Ramos, T. Ultrafine particle emissions from desktop 3D printers. *Atmospheric Environment* 2013, 79, 334-339.

(13) Kari, G.; Rodeck, U.; Dicker, A. P. Zebrafish: an emerging model system for human disease and drug discovery. *Clinical Pharmacology and Therapeutics* 2007, 82, 70-80.

(14) Lieschke, G. J.; Currie, P. D. Animal models of human disease: zebrafish swim into view. *Nature Reviews Genetics* 2007, 8, 353-367.

(15) Carvan, M. J.; Dalton, T. P.; Stuart, G. W.; Nebert, D. W. Transgenic zebrafish as sentinels for aquatic pollution. *Annals of the New York Academy of Sciences* 2000, 919, 133-147.

(16) Crump, S. S. Modeling apparatus for three-dimensional objects. 1994; U.S. Pat. No. 5,340,433.

(17) Formlabs Inc., Materials Safety Data Sheet for Clear Photoreactive Resin for Form 1+. 2014.

(18) Yoshii, E. Cytotoxic effects of acrylates and methacrylates: relationships of monomer structures and cytotoxicity. *Journal of Biomedical Materials Research* 1997, 37, 517-524.

(19) Autian, J. Structure-toxicity relationships of acrylic monomers. *Environmental Health Perspectives* 1975, 11, 141.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the invention and the following claims.

What is claimed is:

1. A method of reducing the toxicity of a 3D-printed article, comprising
    obtaining a 3D printed article from a 3D printer; and
    exposing the article outside the 3D printer to ultraviolet light whereby to reduce its toxicity compared to that of an article prepared by the same 3D printer but not exposed to ultraviolet light.

2. The method of claim 1, wherein the article is printed by an extrusion deposition process or a photopolymerization process.

3. The method of claim 1, wherein the article is printed with a photocurable liquid resin.

4. The method of claim 3, wherein the resin comprises one or more acrylic monomers.

5. The method of claim 1, wherein the article is printed with a thermoplastic polymer.

6. The method of claim 5, wherein the polymer is acrylonitrile butadiene styrene.

7. The method of claim 1, wherein the ultraviolet light has a wavelength of about 350 nm to about 400 nm.

8. The method of claim 1, wherein the article maintains its integrity and/or appearance following the exposing of the article to ultraviolet light.

9. A 3D-printed article having reduced toxicity prepared by the method of obtaining a 3D printed article from a 3D printer; and exposing the article outside the 3D printer to ultraviolet light whereby to reduce its toxicity compared to that of an article prepared by the same 3D printer but not exposed to ultraviolet light.

10. The article of claim 9, wherein the obtained article is printed with a photocurable liquid resin comprising one or more acrylic monomers.

* * * * *